Aug. 18, 1942.    H. MOECKER, JR., ET AL    2,293,399
FASTENING DEVICE FOR WALLS OF STOVE STRUCTURES
Filed Feb. 9, 1940    2 Sheets-Sheet 1
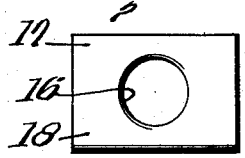
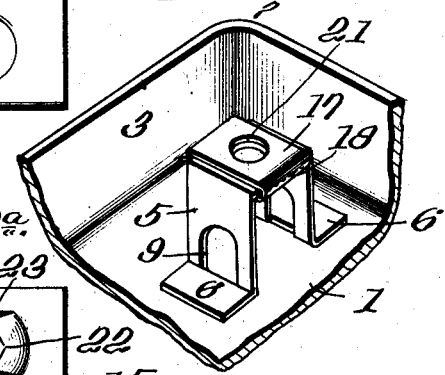
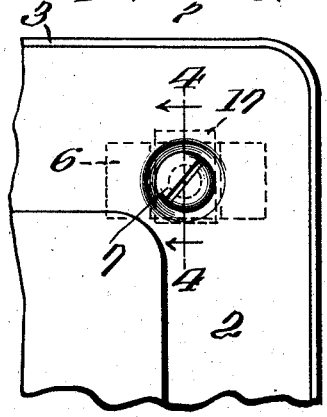
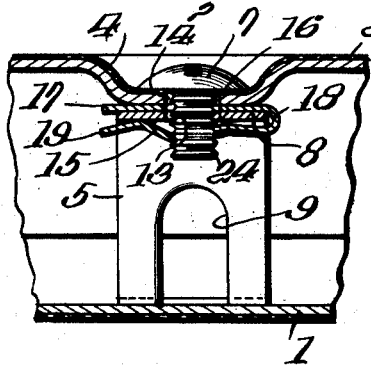
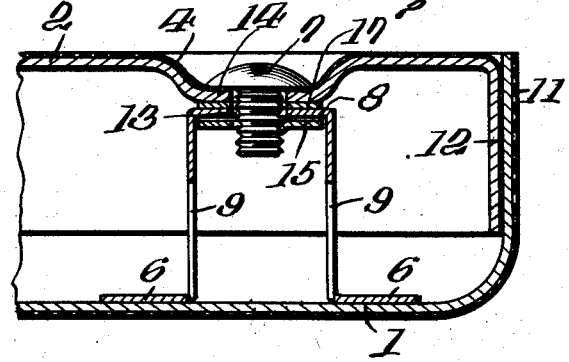
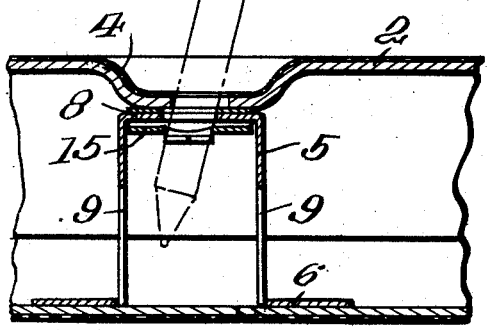
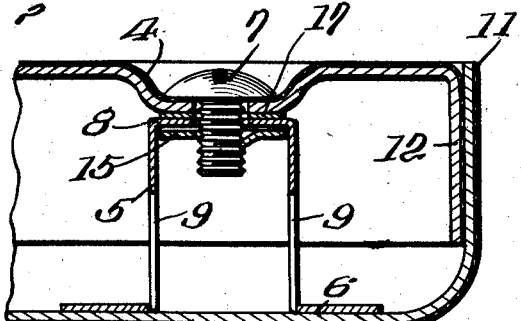
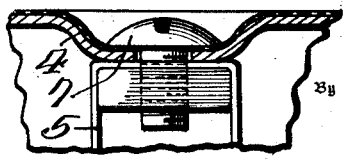
INVENTORS
H. Moecker, Jr.
William Loth
Patterson, Wright & Patterson
ATTORNEYS Aug. 18, 1942.  H. MOECKER, JR., ET AL  2,293,399
FASTENING DEVICE FOR WALLS OF STOVE STRUCTURES
Filed Feb. 9, 1940  2 Sheets-Sheet 2
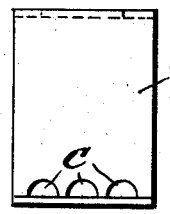
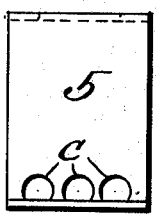
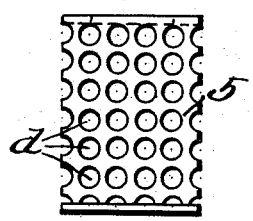
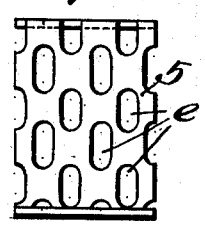
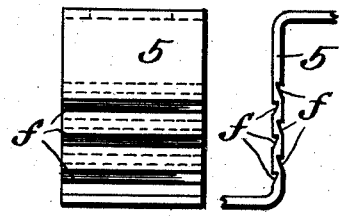
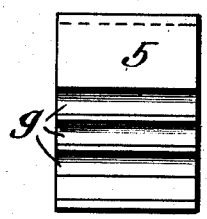
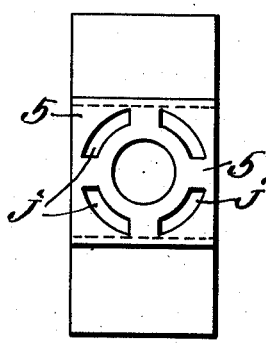
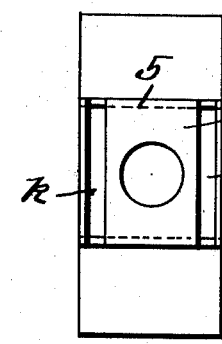
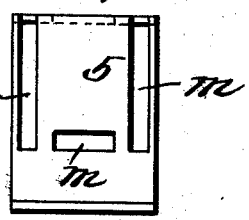
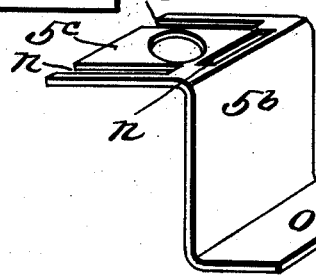
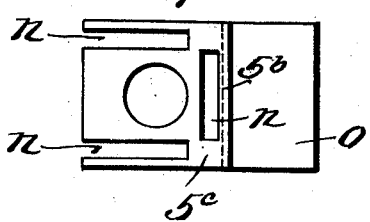
INVENTORS
H. Moecker, Jr.
William Loeller
By Patterson, Wright & Pattison
ATTORNEYS Patented Aug. 18, 1942

2,293,399

UNITED STATES PATENT OFFICE 2,293,399

FASTENING DEVICE FOR WALLS OF STOVE STRUCTURES

Henry Moecker, Jr., and William Lotter, Cleveland, Ohio, assignors to American Stove Company, St. Louis, Mo., a corporation of New Jersey Application February 9, 1940, Serial No. 318,153

6 Claims. (Cl. 189—36)

This invention relates to improvements in fastening devices for walls of stove structures, and it is broadly for use in fastening separated sheets of metal together.

The present invention is applied to metal sheets which are used in the manufacture of stoves, as for instance to stove doors which consist of an outer metal sheet and a metal lining which is attached to the inner side of the door by screws that pass through openings in the lining and usually into openings in members projecting inward from the door though the present improvement is also adapted to connect a stove lining to the outer enameled sheet of a stove housing.

The invention is particularly intended to attach a lining to the enameled wall of a stove door without any danger of chipping the enamel on said door.

It is well known that enamel is a vitreous substance and that in aligning the holes in the sheets to receive the attaching screws the enamel is likely to be and frequently is chipped or injured, thus making the enameled sheets commercially worthless.

The main object of said invention is to so construct the fastening devices that the likelihood of injury to the enamel thereon is preventable when aligning the holes to receive the fastening screw bolts.

Other objects and advantages will appear from the following description.

In the accompanying drawings:

Figure 1 is a perspective view of one corner of a stove door showing the improved fastening device attached to the outer sheet thereof.

Figure 2 is a plan view showing a specific form of screw nut which is involved in the improvement.

Fig. 2a is a separate view of the screw nut.

Figure 3 is a plan view looking from the outer side of the lining and showing the fastening device in dotted lines.

Figure 4 is a vertical sectional view taken on line 4—4 of Figure 3.

Figure 5 is a vertical section taken at right angles to Figure 4.

Figure 6 is a vertical sectional view of a door and its lining taken centrally through two of the fastening devices, one in clamped position, and a drift pin shown as being used to align the holes of the other fastening device into a clamping position.

Figure 7 is a vertical section showing a modified form of the screw nut forming part of the fastening device.

Figures 8 to 22 inclusive show other modified forms of flexible or bendable fastening devices for aligning the openings to receive the clamping screws, which will be specifically described hereinafter.

A construction having somewhat the same general appearance as that appearing in Figs. 1 and 4 to 7 of the drawings has long been used for securing a two-part range door together. In prior devices there has been a spacer of somewhat similar appearance to that designated by 5 in the drawings and this spacer has been provided with a threaded opening for the reception of a threaded bolt. This spacer however has not been bendable with the result that in many instances the bolt holes in the inner door panel would not line up with the threaded bolt receiving openings in the spacers. It was this condition which in the past has caused the damaging or chipping of the enamel when effort was made to bring the bolt holes in alignment by use of a drift pin or some other means. The above construction has been used by manufacturers of stoves including the American Stove Company, for a great many years to our personal knowledge. All the above parts, the door, the lining, the rigid U-shaped member are all manufactured of stamped sheet metal, and for many years these parts—especially the door and lining—have each been enameled. Also these parts have each been heretofore provided with screw openings, including the rigid U-shaped member 5 before enameling, i. e., the parts are all finished before they pass to the enameling oven. The enameling process subjects said parts to a high degree of heat, and although the punched openings may register before enameling it is found that many of the registering openings have been disturbed sufficiently to require the use of a "drift pin" 10 to get the screw holes in proper alignment, and such use of the drift pins heretofore frequently causes the enamel on the outer side of the door to be "chipped," which makes the door a "cull."

In our improved construction we show the vertical portions 5 in Figures 1 and 4 to 7 made of metal which is very much thinner than the door to which it is attached and cut away part of said vertical portions 5 at 9 and construct it of bendable malleable or soft metal. In this way said U-shaped member 5 can be bent and when it is so readily and fixably bent as shown by a drift pin 10, or otherwise moved, it will remain in its changed fixed position. By making said U-shaped member 5 easily fixably bent the enamel on the parts connected are relieved of any injurious strain which might cause chipping.

In Figures 8 to 22 inclusive the U-shaped member 5 is composed of malleable or soft metal as previously stated, and in Figures 8 and 9 the member 5 is made readily fixably bendable by providing the legs of said member 5 with a plurality of perforations c, for the purpose explained in connection with the lower cut out openings 9 shown clearly in Figure 1.

Referring to Figure 10 the member 5 is shown with a plurality of circular cut out openings d uniformly distributed throughout the vertical legs of said member and in Figure 11 the cut out openings e are of oblong shape and are distributed throughout the vertical legs.

In Figures 12 and 13 the members 5 are made readily fixably bendable by providing said legs with transversely extending cut out portions f which may be on both sides of said legs, or on one side only, for the purpose described in connection with the preceding figures.

Figures 14 and 15 show said members 5 with vertically elongated cut out portions g, and in Figures 16 and 17 said legs are provided with transversely extending corrugations h which are for making said members readily bendable for the purpose described in connection with the preceding figures.

In Figure 18 the top portion 5a of the U-shaped member is made readily bendable by providing said top with curved cut-out openings j, while in Figure 19 the top portion 5a is provided with horizontal cut-out portions k, and in Figure 20 the leg portions are provided with vertically and transversely extending cut-out portions m, and in Figures 21 and 22 the member corresponding with the member 5 of the preceding figures is made substantially Z-shaped as at 5b and its top portion 5c is provided with cut-out openings n, while its portion o is welded to the door l. All of the above constructions make the parts described readily bendable to a fixed shape, whereby said fastening operations can be readily and quickly accomplished without injury to the enamel on said door.

This invention is specifically for use in connecting two prepared sheets of metal in parallel separated relation and the improved fastening is between said sheets and the fastening is not accessible from outside, and this is especially true when the two sheets have overlapping edges 11 and 12 as here shown in Figures 5 and 6 which completely enclose said fastening devices. As previously stated the invention prevents injury to the enamel thereby making a cull of the injured part and thereby effecting a saving, and it makes speedier assembly operations as well and therefore effects a further saving. With these savings the cost is reduced, which means a saving to the consumer. So far as applicants' knowledge goes the above rigidly fixed parts have been known to manufacturers and to applicants for years, but to applicants' knowledge no one ever discovered a remedy for these defects prior to applicants' invention which is set forth herein.

Several constructions are shown herein for effecting the above savings, and the preferred form here shown will now be explained.

This preferred form is illustrated in Figures 1 to 6 inclusive. This preferred construction comprises the U-shaped member 5 made of malleable metal, as described, which has an opening 13, and the lining 4 has an opening 14, and these two openings are of substantially the same diameter. A nut 15 is under said top 8, and for the purpose of holding said nut to the top 8 it has a top portion 17 which is doubled as at 18 and extends parallel to said nut and above the top 8 as shown in Figures 4 to 6 inclusive which forms a holding member 17 that is between the under side of said lining 4, and the top 8. This member 17 has an opening 16, Figure 2 which is in alignment with the opening in the nut 15 through the opening Figure 1 and is of substantially the same diameter as the openings 14 and 16. The nut 15 is formed by stamping or cutting the two parallel slits 30 which leaves the two substantially curved parts 22 which form the four points and some of these points are raised and others depressed by the die cutting them so that they will engage the threads on the stem 24 of the screw bolt 7 and act as an ordinary screw nut. This it will be understood makes said member 5 a nut retainer and enables the nut 15 to be moved laterally on the member 5 to cause the nut 15 and the opening 13 of the bendable member to align with the lining opening 14, and opening 16 of the member 17 and at the same time enable the bendable member 5 to be readily fixably bent should it be necessary to cause the alignment of the several plate and nut openings. It will be understood that this improvement is intended to act to bring the several openings—irrespective of number—in substantially fixed alignment to enable the screw stem 24 to freely enter said openings and at the same time prevent the enamel being chipped and to enable the assemblage to be more quickly made as described herein.

We claim:

1. In combination, an inner and an outer plate and means for fastening the same in spaced relation, said inner plate being provided with a bolt opening, a spacer element associated with said bolt opening and having one end secured to the inner face of said outer plate, said element having a leg portion for supporting said inner plate in spaced relationship to said outer plate, said element leg portion being provided with a bolt opening and a nut aligned with said opening for threadedly receiving a bolt, and said element intermediate its length being weakened to render said element readily bendable to bring the bolt opening of said leg and said nut into alignment with the bolt opening of said inner plate.

2. In combination, an inner and an outer plate and means for fastening the same in spaced relation, said inner plate being provided with a plurality of bolt openings in separated relationship, a spacer element associated with each of said bolt openings, said elements having one end secured to the inner face of said outer plate and a leg portion for supporting said inner plate in separated relationship to said outer plate, said element leg portion being provided with a bolt opening and a nut aligned with said opening for threadedly receiving a bolt, and each of said elements intermediate its fastened end and the bolt opening in its leg portion being weakened to render said elements readily bendable to bring the bolt opening in said leg and nut into alignment with that particular bolt opening in the inner plate with which said element is associated.

3. A construction such as defined in claim 1 wherein, the nut is retained on said element leg portion under resilient tension and is movable on said leg portion to align the nut opening with said bolt opening of said leg portion.

4. A construction such as defined in claim 2 wherein, said nuts are retained on said element leg portions under spring tension and are movable to align the nut opening with the bolt opening of said leg portion.

5. In combination, an inner and an outer plate and means for fastening the same in spaced relation, said inner plate being provided with a plurality of bolt openings in separated relationship, a spacer element associated with each of said bolt openings, each of said elements being of a U-shape in cross sectional configuration, the side legs of said element being attached to the inner face of said outer plate and the bottom leg of said elements supporting said inner plate in spaced relationship to said outer plate, said bottom leg of said elements being provided with a bolt opening and a nut aligned with said opening for threadedly receiving a bolt, and the side legs of said elements being weakened to render them readily bendable to bring the bolt opening and the opening of the nut of said bottom leg into alignment with that particular bolt opening in the inner plate with which said element is associated.

6. A construction such as defined in claim 5 wherein, the side legs of said spacer elements are provided with cut-out portions to weaken said legs.

HENRY MOECKER, Jr.
WILLIAM LOTTER.